US012713169B2

(12) United States Patent
Wang

(10) Patent No.: US 12,713,169 B2
(45) Date of Patent: Aug. 18, 2026

(54) CUSTOMIZED WIRELESS EARPHONE

(71) Applicant: EARWEISS TECHNOLOGY (SHENZHEN) CO., LTD., Shenzhen (CN)

(72) Inventor: Yingwei Wang, Nanjing (CN)

(73) Assignee: EARWEISS TECHNOLOGY (SHENZHEN) CO., LTD., Shenzhen (CN)

( * ) Notice: Subject to any disclaimer, the term of this patent is extended or adjusted under 35 U.S.C. 154(b) by 530 days.

(21) Appl. No.: 18/174,203

(22) Filed: Feb. 24, 2023

(65) Prior Publication Data

US 2023/0269512 A1 Aug. 24, 2023

(30) Foreign Application Priority Data

Feb. 24, 2022 (CN) ......................... 202210172393.9

(51) Int. Cl.

*H04R 1/1025* (2026.01)
*H04R 1/10* (2006.01)

(52) U.S. Cl.

CPC ......... *H04R 1/1016* (2013.01); *H04R 1/1025* (2013.01); *H04R 1/1041* (2013.01); *H04R 1/1075* (2013.01); *H04R 2420/07* (2013.01)

(58) Field of Classification Search

CPC .. H04R 1/1016; H04R 1/1025; H04R 1/1041; H04R 1/1075; H04R 2420/07; H04R 1/1091; H04R 25/603; H04R 25/609; H04R 2460/11; H04R 1/1058; H04R 2225/025

See application file for complete search history.

(56) References Cited

U.S. PATENT DOCUMENTS

| | | | | |
|---|---|---|---|---|
| 4,476,353 | A | 10/1984 | Haertl | |
| 5,781,637 | A | 7/1998 | Jorgen | |
| 10,129,635 | B1 * | 11/2018 | Zhu | H04R 1/1091 |
| 2016/0050474 | A1 | 2/2016 | Rye et al. | |
| 2018/0227686 | A1 | 8/2018 | Frei et al. | |
| 2021/0029437 | A1 | 1/2021 | Tseng | |
| 2021/0037307 | A1 * | 2/2021 | Huang | H01L 23/552 |

(Continued)

FOREIGN PATENT DOCUMENTS

| | | | |
|---|---|---|---|
| CN | 204616041 U | | 9/2015 |
| CN | 205545773 U | * | 8/2016 |

(Continued)

OTHER PUBLICATIONS

Manoj Kumar, Examination Report of Indian Patent Application No. 202324010456, dated Mar. 11, 2024, Kolkata, India.

(Continued)

*Primary Examiner* — Alison Slater
(74) *Attorney, Agent, or Firm* — ScienBiziP, P.C.

(57) ABSTRACT

The present disclosure relates to a customized wireless earphone, which includes a panel assembly and a customized housing. The panel assembly includes a panel, a mainboard, a manipulation device, a charging device, a battery, an antenna device, a sound pickup device, a speaker assembly, and a wireless communication module. The mainboard, the manipulation device, the charging device, the battery, the antenna device, the sound pickup device, the speaker assembly, and the wireless communication module are located in a space formed by the panel and the customized housing.

14 Claims, 8 Drawing Sheets

(56) References Cited

U.S. PATENT DOCUMENTS

| | | | | |
|---|---|---|---|---|
| 2021/0306773 | A1 | 9/2021 | Kvist | |
| 2021/0352394 | A1* | 11/2021 | Wen | H04R 1/1075 |

FOREIGN PATENT DOCUMENTS

| | | | | |
|---|---|---|---|---|
| CN | 209994534 | U | * | 1/2020 |
| CN | 213602808 | U | | 7/2021 |
| CN | 214205798 | U | | 9/2021 |
| WO | 2019085063 | A1 | | 5/2019 |

OTHER PUBLICATIONS

Yosuke Hori, Notice of Reasons for Refusal of Japanese Patent Application No. 2023-026119, dated Mar. 5, 2024, Japan.

Search Report of EP Patent Application No. 23157701.6, dated Jun. 29, 2023.

Liping Ding, Notice of Second Office Action with Search Report of Chinese Patent Application No. 202210172393.9, dated Jan. 25, 2025, Beijing, China.

Communication from European Patent Office regarding EP Application No. 23157701.6, dated Mar. 14, 2025, Rijswijk, Netherlands.

Hearing Notice in Indian Patent Application No. 202324010456, dated Mar. 26, 2025, Kolkata, India.

Liping Ding, Notice of Office Action with Search Report of Chinese Patent Application No. 202210172393.9, dated Aug. 24, 2024, Beijing China.

* cited by examiner

CUSTOMIZED WIRELESS EARPHONE

This application claims priority to Chinese Patent Application No. 202210172393.9 filed on Feb. 24, 2022, presently pending, which is incorporated herein by reference in its entirety.

TECHNICAL FIELD

The present disclosure relates to earphones, and particularly to a customized wireless earphone.

BACKGROUND

As the application scenarios of mobile devices such as smart phones are becoming extensive, and people use more and more audio and video services, wireless earphones are rapidly popularized because of the advantages such as portability and no entanglement, and TWS (True Wireless Stereo) Bluetooth earphones have become mainstream products of the wireless earphones due to the advantages such as short delay and good sound quality.

However, the TWS Bluetooth earphones at present are all of standard sizes. Due to the different shapes and sizes of various users' acoustic meatuses, the earphones are not satisfactory in comfort, stability, sound insulation and noise reduction, which limits the application scenarios of the TWS Bluetooth earphones.

SUMMARY

At present, there are mainly two types of Bluetooth earphones, i.e., an in-ear earphone and a semi-in-ear earphone. The in-ear earphone adopts earplugs of different models, and has the advantages of good physical sound insulation, good active noise reduction effect and good wearing stability, but the disadvantages are strong foreign body sensation and poor comfort. The semi-in-ear earphone has the advantage of comfortable wearing, but the disadvantages are poor sound insulation, poor active noise reduction effect and easy to fall off and lose. The present disclosure provides a third type of earphone, which effectively solves the problems of how to give considerations to comfort, stability, sound insulation and noise reduction effect, and the like.

In an embodiment, the present disclosure provides a customized wireless earphone, comprising a panel assembly and a customized housing, wherein the panel assembly comprises a panel, a mainboard, a manipulation device, a charging device, a battery, an antenna device, a sound pickup device, a speaker assembly and a wireless communication module; the mainboard, the manipulation device, the charging device, the battery, the antenna device, the sound pickup device, the speaker assembly and the wireless communication module are located in a space formed by the panel and the customized housing; the panel comprises a first edge that comprises a first section, and a second edge that comprises a second section; when a user wears the customized wireless earphone, the first section is corresponding to a tragus of the user, the second section is corresponding to an antitragus of the user, and the first edge is extended in a first direction of the panel; the panel has a length of 22.4 to 28.2 mm and a width of 14.3 to 20.3 mm, wherein the length of the panel is a dimension of the panel in the first direction, and the width of the panel is a dimension of the panel in a second direction which is a direction on the panel perpendicular to the first direction.

In an embodiment, the first direction is a direction parallel to a meeting line of the user's ear and face when the user wears the customized wireless earphone, or a direction having an angle within 45° with the meeting line.

In an embodiment, a first angle formed by the second section and the first section, or the first edge or the first direction is 45° to 65°.

In an embodiment, the first angle formed by the second section and the first section, or the first edge or the first direction is 50° to 60°.

In an embodiment, the panel has a length of 23.9 to 26.1 mm and a width of 15.0 to 17.2 mm.

In an embodiment, the panel further comprises a third edge, and the second edge and the third edge are close to each other in a direction away from the first edge.

In an embodiment, a second angle formed by the third edge and the first section, or the first edge or the first direction is greater than the first angle.

In an embodiment, at least one of the first edge, the second edge and the third edge is a straight line or a curve, and the first edge, the second edge and the third edge are connected to each other by a rounded corner or an arc.

In an embodiment, the panel is substantially a triangle with rounded corners or a D-shape.

In an embodiment, orthographic projections of the mainboard, the manipulation device, the charging device, the battery, the antenna device, the sound pickup device, the speaker assembly and the wireless communication module on a plane where the panel is located are located within the panel.

In an embodiment, the customized wireless earphone further comprises a magnet, wherein the manipulation device, the magnet, the mainboard and the battery are sequentially disposed below the panel.

In an embodiment, the customized wireless earphone further comprises a panel adaption portion through which the panel is mounted to the customized housing.

In an embodiment, the panel adaption portion is integral with the customized housing.

In an embodiment, the manipulation device is a touchpad that can be manipulated from above the panel, and the charging device is a charging pin or a metal coil that can charge the customized wireless earphone through the panel.

In an embodiment, the customized wireless earphone further comprises a ventilation duct disposed in the customized housing for ventilation when a user wears the customized wireless earphone.

In an embodiment, the customized housing comprises an inner core portion and a customized adaption portion.

In an embodiment, the customized housing comprises a first protruding portion and a second protruding portion, and when the user wears the customized wireless earphone, the first protruding portion is located in an external acoustic meatus of the user or an auricular concha cavity and the external acoustic meatus of the user, and the second protruding portion is located in a cymba conchae of the user.

In an embodiment, the first protruding portion comprises an opening, and the speaker assembly is located in the first protruding portion close to the opening.

In an embodiment, the customized wireless earphone further comprises an in-ear detection sensor configured to detect whether the customized wireless earphone is in a wearing state.

In an embodiment, the mainboard is a folded circuit board or a flexible circuit board, and at least partially surrounds the battery.

By designing the shape and the size of the panel, the customized wireless earphone can be well matched with the shape of the ear when being worn, thereby reducing the compression of the customized wireless earphone on the ear, and improving the wearing comfort, the stability and the sound insulation and noise reduction effect of the earphone. Meanwhile, by designing the shape and the size of the panel, the components of the panel assembly can work normally while maintaining a high adaptation rate of the panel assembly, so that the panel assembly of the same specification can be mainly used in the production process, thereby reducing the production cost and improving the production efficiency of the earphone.

BRIEF DESCRIPTION OF THE DRAWINGS

Features, advantages and technical effects of the exemplary embodiments of the present application will be described below with reference to the drawings.

DETAILED DESCRIPTION OF THE EMBODIMENTS

Figure 1:
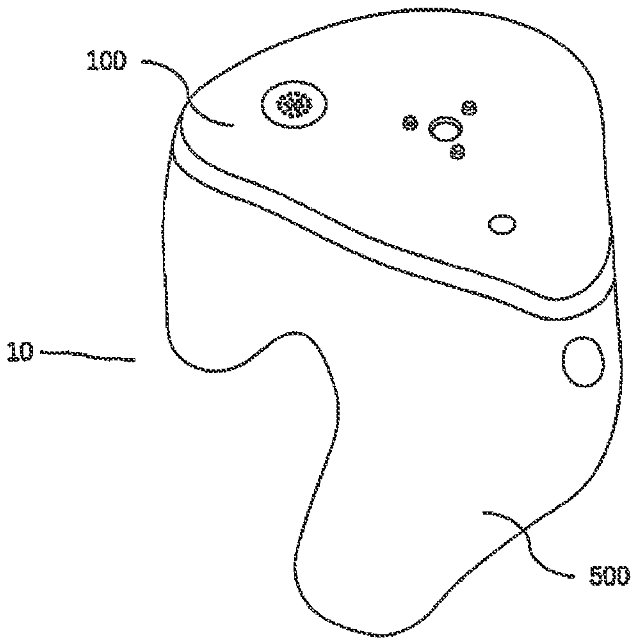
FIG. 1 shows a perspective view of a customized wireless earphone according to an embodiment of the present disclosure.

The specific embodiments of the present application are described below with reference to the drawings. In the drawings, the same or similar reference numerals are used to denote the same or similar components, and the repeated descriptions thereof are omitted for simplicity.

FIG. 1 shows a perspective view of a customized wireless earphone 10 according to an embodiment of the present disclosure. Only one earphone (e.g., a left earphone) is shown in FIG. 1, but those skilled in the art will appreciate that a pair of earphones usually is usually composed of a left earphone and a right earphone, which are substantially symmetrical in structure and are communicated in a wireless manner. Thus, for the sake of simplicity, only one earphone is shown in the drawing, and the following description is given only for one earphone. Referring to FIG. 1, the customized wireless earphone 10 according to this embodiment includes a panel assembly 100 and a customized housing 500. The customized housing 500 for example may be manufactured using a manufacturing device based on an ear mold taken from a user's ear (including parts such as an external acoustic meatus, an auricular concha cavity and/or a cymba conchae). The manufacturing method for example may be 3D printing. The size of the customized housing 500 may be the same as that of the taken ear mold, or slightly smaller than that of the taken ear mold to improve the wearing comfort for some sensitive users.

At present, the wireless earphones are all of standard sizes. Due to the different shapes and sizes of various users' acoustic meatuses, the standard earphones have the problems that the users are uncomfortable to wear, the devices are prone to falling off, and the sound insulation and noise reduction effect is poor, which limit the wearing time and the application scenarios of the earphones. In a case of the standard earphones, in order to adapt to the sizes of most users' ears (e.g., the auricular concha cavities), the sizes of the earphones should be as small as possible. But in order to ensure stable wearing without falling off, the earphones need to be provided with some protrusions so as to be firmly stuck on the ears. In this case, when the standard earphones are worn, some parts of the acoustic meatuses or the auricles of most users will be compressed, thereby resulting in discomfort caused by long-term wearing. For example, many users will feel uncomfortable with their ears after wearing the standard headphones for 30 minutes or even less. In addition, although the wearing stability of the standard earphones is improved by providing some protrusions, the improvement degree is limited, and the problem of easy falling off still exists. Meanwhile, due to the poor fit between the standard earphone and the ear (e.g., the auricular concha cavity and/or the acoustic meatus), the sound insulation and noise reduction effect is poor. However, in the present disclosure, the housing 500 of the customized wireless earphone 10 is customized for the user and substantially does not compress the user's ear. Thus, as compared with the standard earphone, the customized wireless earphone 10 of the present disclosure improves the wearing comfort, with the housing 500 well fitted with the user's ear (e.g., the external acoustic meatus), thereby being stable to wear, not easy to fall off, and achieving a good sound insulation and noise reduction effect. Under the conditions of good wearing comfort, stability and sound insulation and noise reduction effect, the user can wear the earphone for a longer time, such as several hours or even longer. Further, since the user can wear the earphone for a longer time, it is more possible for the user to apply the earphone in various scenarios. For example, in addition to the conventional audio and video services, the earphone can also be used to make voice or video calls, play games, and carry out various virtual reality activities.

Figure 2:
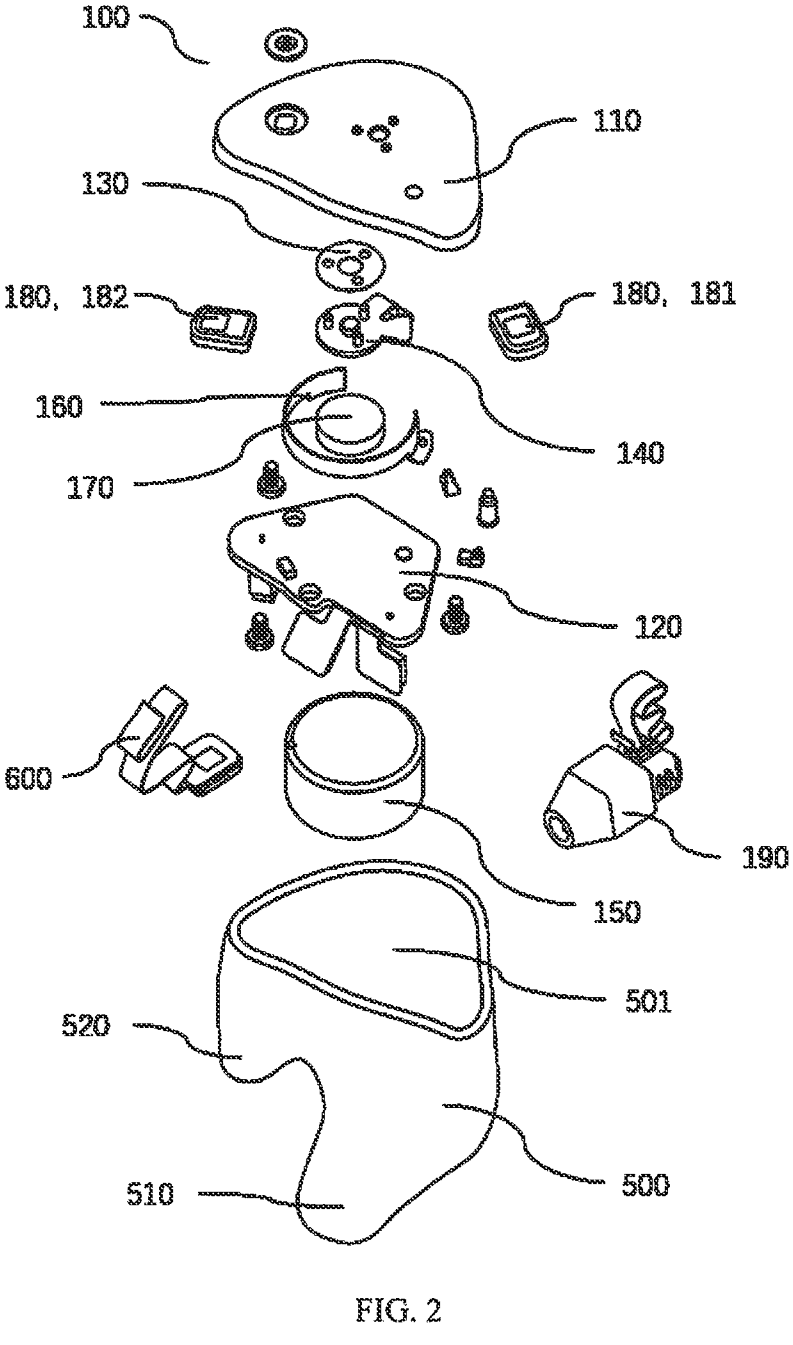
FIG. 2 shows an exploded view of a customized wireless earphone according to an embodiment of the present disclosure.

FIG. 2 is an exploded view of a customized wireless earphone 10 according to an embodiment of the present disclosure. Similar to FIG. 1, the customized wireless earphone 10 according to this embodiment includes a panel assembly 100 and a customized housing 500. Referring to FIG. 2, the panel assembly 100 may include a panel 110, a mainboard 120, a manipulation device 130, a charging device 140, a battery 150, an antenna device 160, a sound pickup device 180, a speaker assembly 190, a wireless communication module 195 (not shown), and the like. In an embodiment, the panel assembly 100 may further include a magnet 170. In another embodiment, the panel assembly 100 may not include the magnet 170. In an embodiment, the sound pickup device 180 may include a first sound pickup device 181 and a second sound pickup device 182. Although the sound pickup device 180 is shown to include two sound pickup devices 181 and 182 in FIG. 2, in other embodiments, more or less sound pickup devices may be used according to actual needs. As an example, the sound pickup device may be a microphone such as a micro-electromechanical microphone (also known as a silicon microphone).

In an embodiment, the customized wireless earphone 10 may further include an in-ear detection sensor 600 configured to detect whether the customized wireless earphone 10 is in a wearing state. When detecting that the customized wireless earphone 10 is in a non-wearing state, the in-ear detection sensor 600 may send a signal (i.e., a signal indicating that the customized wireless earphone 10 is in the non-wearing state) to a control unit (e.g., a central processing unit or a main control unit) of the customized wireless earphone 10, so as to set the customized wireless earphone 10 in a standby state, a working suspended state, any other non-working state, an off state, or the like. When detecting that the customized wireless earphone 10 is in the wearing state, the in-ear detection sensor 600 may send a signal (i.e., a signal indicating that the customized wireless earphone 10 is in the wearing state) to the control unit of the customized wireless earphone 10, so as to set the customized wireless earphone 10 in the working state, turn on the customized wireless earphone 10 in a case where the customized wireless earphone 10 is originally turned off, or keep the customized wireless earphone 10 in the original working state.

Figure 3:
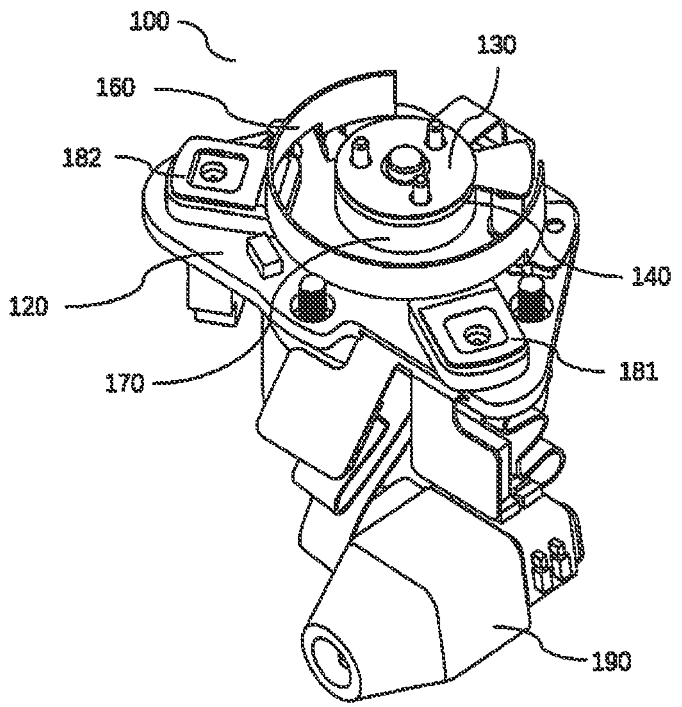
FIG. 3 shows an assembly diagram of part of components of a customized wireless earphone according to an embodiment of the present disclosure.

Although the panel assembly 100 is illustrated herein to include the panel 110 and the various components, it is not required that the panel 110 and the various components are formed as one piece, and they may be provided separately as appropriate. For example, the panel 110 may be separated from other components, and they are mounted together only at an assembly stage of the customized wireless earphone 10, or mounted separately to the housing 500. The components may also be arranged in different modules. For example, the manipulation device 130, the charging device 140 and the battery 150 may be arranged in one module, and other components may be arranged in another module. Of course, other arrangements may also be adopted, which is not limited in the present disclosure. FIG. 3 is an assembly diagram of part of components of a customized wireless earphone 10 according to an embodiment of the present disclosure. In FIG. 3, the panel 110 is not shown for clarity. As shown in FIG. 3, the components may be assembled together by means of bolts, welding, gluing, clamping and the like.

Referring back to FIG. 2, the components such as the mainboard 120, the manipulation device 130, the charging device 140, the battery 150, the antenna device 160, the magnet 170, the sound pickup device 180, the speaker assembly 190, and the wireless communication module 195 may be located in a space formed by the panel 110 and the customized housing 500. Specifically, these components may be mainly located in an inner cavity 501 of the customized housing 500, and the panel 110 may be used to enclose the inner cavity 501. The panel 110 may be a flat cover plate or any rugged or uneven cover plate as long as other components can work normally. In a case where the manipulation device 130 is a touchpad operated by the panel 110, the panel 110 is usually a flat or nearly flat cover plate to ensure that the touchpad can be better operated.

Figure 4:
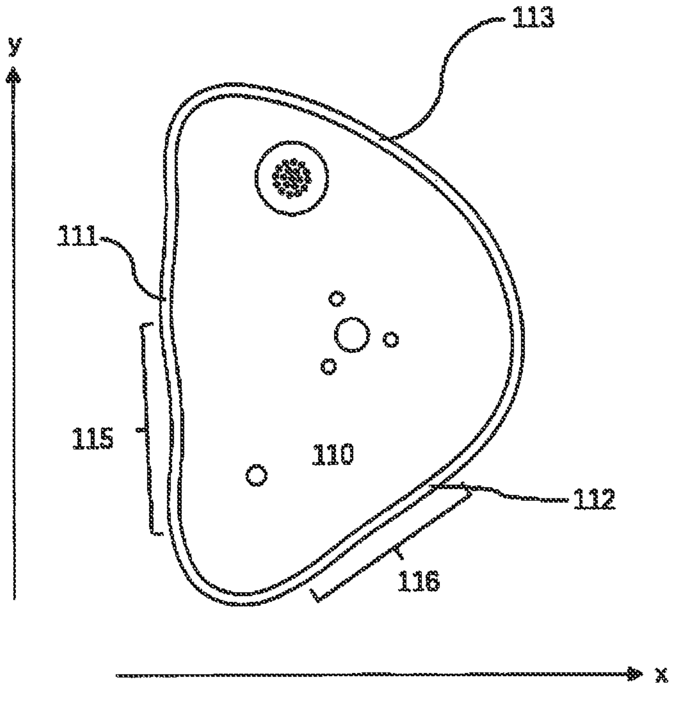
FIG. 4 shows a top view of a panel according to an embodiment of the present disclosure.

FIG. 4 shows a top view of a panel 110 according to an embodiment of the present disclosure. As shown in FIG. 4, the panel 110 may include a first edge 111 which may include a first section 115, and a second edge 112 which may include a second section 116. When the user wears the customized wireless earphone 10, the first section 115 may be corresponding to a tragus of the user and the second section 116 may be corresponding to an antitragus of the user. The first edge 111 may be extended in a first direction y of the panel 110.

Figure 7:
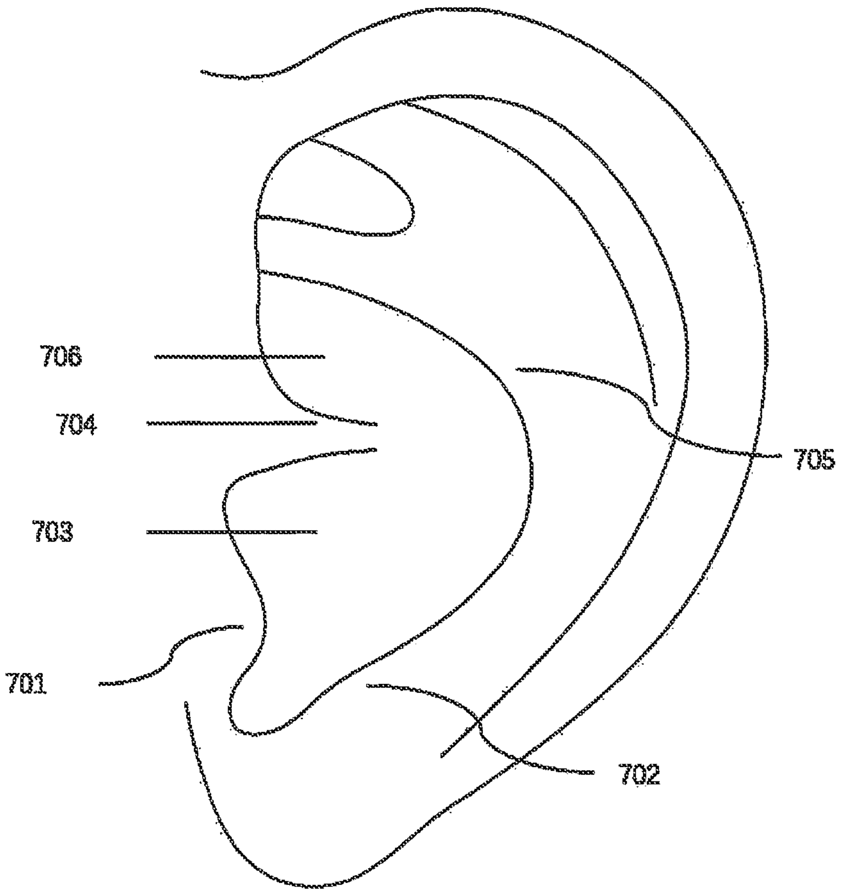
FIG. 7 shows a schematic structural diagram of a user's ear.
Figure 8:
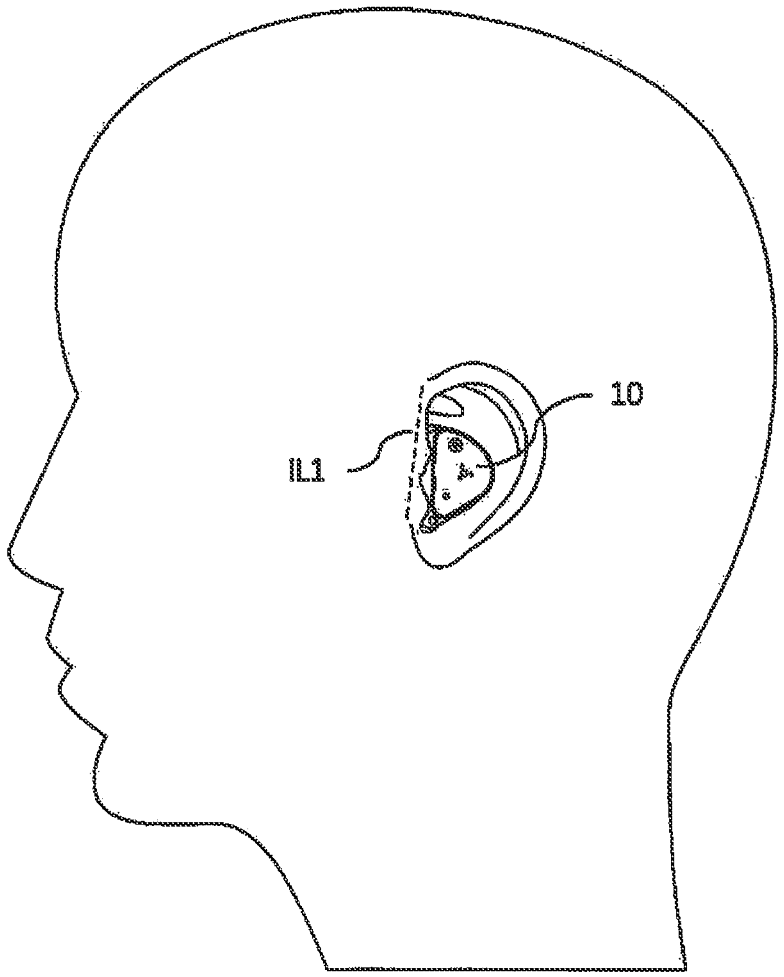
FIG. 8 shows a schematic diagram of wearing of a customized wireless earphone according to an embodiment of the present disclosure.

The first edge 111 may be an edge close to the user's face when the user wears the customized wireless earphone 10, and the second edge 112 may be an edge close to a lower rear part (antitragus) of the user's ear when the user wears the customized wireless earphone 10. FIG. 7 shows a schematic structural diagram of a user's ear, and FIG. 8 shows a schematic diagram of wearing of a customized wireless earphone 10 according to an embodiment of the present disclosure. With reference to FIGS. 7 and 8, a state in which the user wears the customized wireless earphone 10 can be better understood.

The first section 115 may be corresponding to the tragus of the user, i.e., the first section 115 may be close to the tragus of the user's ear when the user wears the customized wireless earphone 10. In an embodiment, the first section 115 may fit the tragus of the user when the user wears the customized wireless earphone 10. In another embodiment, the first section 115 may be at a distance from the tragus of the user when the user wears the customized wireless earphone 10.

In an embodiment, referring to FIG. 4, the first section 115 may be a curve with a slight depression in the middle thereof to better fit the tragus of the user, thereby improving the user's wearing comfort, the stability and the sound insulation and noise reduction effect. In a case where the first section 115 is a curve, it may be a portion of the first edge 111 corresponding to the tragus of the user's ear. In a case where both sides of the first section 115 are bulges, i.e., both the middle and the lower parts (as shown in FIG. 4) of the first edge 111 are bulges, end points on both sides of the first section 115 may be corresponding to vertexes of the two bulges. In an embodiment, the first section 115 may be mainly the lower half of the first edge 111. In an embodiment, the first section 115 or even the first edge 111 may be a straight line.

The second section 116 may be corresponding to the antitragus of the user, i.e., the second section 116 may be close to the antitragus of the user's ear when the user wears the customized wireless earphone 10. In an embodiment, the second section 116 may fit the antitragus of the user when the user wears the customized wireless earphone 10. In another embodiment, the second section 116 may be at a distance from the antitragus of the user when the user wears the customized wireless earphone 10.

In an embodiment, referring to FIG. 4, the second section 116 may be a curve with a slight depression in the middle thereof, so as to better fit the antitragus of the user, thereby improving the user's wearing comfort, the stability and the sound insulation and noise reduction effect. In a case where the second section 116 is a curve, it may be a portion of the second edge 112 corresponding to the antitragus of the user's ear. In a case where both sides of the second section 116 are bulges, end points on both sides of the second section 116 may be corresponding to vertexes of the two bulges. In an embodiment, the second section 116 may be a main part of the second edge 112, such as a portion of the second edge 112 except a rounded corner or an arc for connection. In an embodiment, the second section 116 may be a straight line.

In an embodiment, as shown in FIG. 4, the panel 110 may further include a third edge 113, wherein the second edge 112 and the third edge 113 are connected to the first edge 111 through a rounded corner or an arc, and close to each other in a direction away from the first edge 111. The first edge 111 may be extended in the first direction y, and the second edge 112 and the third edge 113 may be connected to two ends of the first edge 111 through the rounded corner or the arc, extended in a direction at an angle (less than 90°) with the first direction y, close to each other in the direction away from the first edge 111, and connected to each other through the rounded corner or the arc. In an embodiment, the second edge 112 and the third edge 113 may be arc-shaped as a whole. In an embodiment, the panel 110 is a D-shape, the first edge 111 forms a straight edge, and the second edge 112 and the third edge 113 together form an arc-shaped edge.

The first direction y of the panel 110 may be a direction substantially parallel to a meeting line of the user's ear and face when the user wears the customized wireless earphone 10, or a direction having an angle, for example within 45°, with the meeting line of the user's ear and face. In an embodiment, the angle may be within 30°. In an embodiment, the first direction y may be consistent with the direction of the first edge 111 or the first section 115. The second direction x of the panel 110 may be a direction perpendicular to the first direction y on the panel 110. As shown in FIG. 8, when the user wears the customized wireless earphone 10, the first direction y or the first edge 111 is substantially parallel to a meeting line IL1 of the user's ear and face. The meeting line IL1 of the user's ear and face may be a tragus root line segment or an ear root line segment, which is a substantially straight line segment where the ear meets the face on a side close to the face and herein only assists in describing the direction of the first edge 111.

In a case where a main part of the first edge 111 is approximately a straight line segment, the first direction y is substantially consistent with the direction of the first edge 111. When the user actually wears the customized wireless earphone 10, the first edge 111 is close to the side of the user's face, and may be substantially parallel to a direction of the meeting line of the user's ear and face, or to a direction of an ear root or a tragus root. The second edge 112 is located at the lower rear (close to the antitragus) and the third edge 113 is located at the upper rear (close to the antihelix), i.e., the second edge 112 and the third edge 113 are located far away from the user's face compared with the first edge 111. In other words, in a case where the user wears the customized wireless earphone 10 while standing at attention, the first direction y is a substantially vertical direction, i.e., a direction substantially perpendicular to the ground. Based on the differences in structures and shapes of the ears of different users, the first direction y may also have an angle, for example within 45°, with the vertical direction. In an embodiment, the angle between the first direction y and the vertical direction is within 30°. The second direction x is substantially perpendicular to the first direction y. According to the user's wearing state, when the first direction y is the substantially vertical direction, the second direction may be a front-rear horizontal direction (a rearward horizontal direction opposite to the direction faced by the user's face) or a lateral-rear horizontal direction (a lateral-rear horizontal direction opposite to the direction faced by the user's face but laterally towards the exterior of the user's body). Of course, based on the differences in structures and shapes of the ears of different users and the differences in the users' standing postures, the first direction y and the second direction x may have angles, for example within 45°, with the directions indicated above.

Referring back to FIG. 4, in an embodiment, the panel 110 is substantially a triangle with rounded corners or a D-shape. For example, the first edge 111 may be corresponding to a straight edge of the D-shape, and the second edge 112 and the third edge 113 may be jointly corresponding to an arc-shaped edge of the D-shape. Although in FIG. 4, the first edge 111, the second edge 112 and the third edge 113 are shown as nearly straight curves and connected by rounded corners or arc segments, the present disclosure is not limited thereto. At least one of the first edge 111, the second edge 112 and the third edge 113 may be a straight line or a curve, and the first edge 111, the second edge 112 and the third edge 113 are connected to each other by a rounded corner or an arc. In an embodiment, the first edge 111, the second edge 112 and the third edge 113 may all be straight lines or curves, and are connected to each other by a rounded corner or an arc. For example, the first edge 111, the second edge 112 and the third edge 113 may be straight lines or have greater curvatures than the shapes shown in FIG. 4, and bulging directions thereof may also be different. For example, each edge may have at least one bulge and/or at least one depression. In an embodiment, at least one of the first edge 111, the second edge 112 and the third edge 113 is a straight line, and the others are curves. For example, the first edge 111 is a straight line, and the second edge 112 and the third edge 113 are curves. Besides the rounded corners or the arc segments, the connections among the first edge 111, the second edge 112 and the third edge 113 may also be achieved by at least one folded line segment or line segment of any other shape.

Based on the shapes obtained by taking ear molds from a large number of users, in order to improve the wearing comfort, the stability, and the sound insulation and noise reduction effect of the earphone and the adaptation rate of the panel assembly, the first edge 111 preferably may be designed as a curve with a bulge in the middle, depressions on both sides of the bulge in the middle, and then bulges with smaller curvatures outside the depressions. Referring to FIGS. 4 and 7, the two depressions may be corresponding to a tragus and a helix crus respectively, and the three bulges may be corresponding to a lower bulge of an auricular concha cavity, a left bulge of the auricular concha cavity and a left bulge of a cymba conchae, respectively. The second edge 112 may be designed as a curve which is nearly straight or has a depression or bulge with a small curvature, and the depression may be corresponding to the antitragus. The third edge 113 may be designed as a curve having a bulge with a small curvature, and the bulge may be corresponding to an antihelix. In an embodiment, the shape of the lower part of the panel 110 may be designed to be substantially similar to those of the tragus, the antitragus and the lower half of the antihelix (referring to FIG. 7), the upper part of the panel 110 is substantially symmetrical with but different from the lower part, and for example the upper part of the panel 110 may be designed to be substantially similar to that of the corresponding part of the antihelix. For example, in the embodiment shown in FIG. 8, after the user wears the customized wireless earphone 10, the customized wireless earphone 10 is mostly located in the auricular concha cavity of the user, with a small part located in the cymba conchae of the user when viewed from the outside. Thus, the first edge 111 may be disposed to have three bulges in the middle and the two ends, respectively, and two depressions between the three bulges, but the curvatures of the bulges and the depressions are small. The second edge 112 is nearly straight or has a depression with a small curvature. The third edge 113 may be a curve similar to a contour of the antihelix, or a curve of any other shape.

Figure 5:
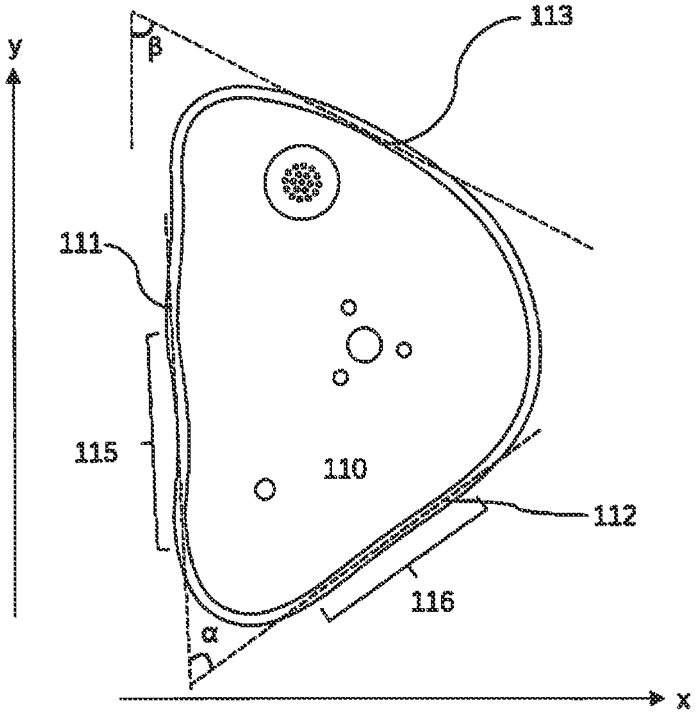
FIG. 5 shows a schematic diagram of a panel according to an embodiment of the present disclosure.

FIG. 5 shows a schematic diagram of a panel 110 according to an embodiment of the present disclosure. As shown in FIG. 5, a first angle α is an angle formed by the second section 116 with the first section 115, or the first edge 111 or the first direction y, and two sides of the first angle α are marked with two dashed lines in FIG. 5. When the first angle α is measured, one side may be a straight line where the second section 116 is wholly located, and the other side may be a straight line where the first section 115 is wholly located, or a straight line where the first edge 111 is wholly located, or in the first direction y. The straight line where the first section 115 is wholly located for example may be a straight line where a connecting line between centers of the two ends of the first section 115 is located, or a straight line that makes the first section 115 have the same length or area on the two sides thereof. The straight line where the second section 116 is wholly located is similar to the first section 115, and the description thereof is omitted here.

The second angle β is an angle formed by the third edge 113 with the first section 115, or the first edge 111 or the first direction y, and two sides of the second angle β are marked with two dashed lines in FIG. 5. When the second angle β is measured, one side may be a straight line where the third edge 113 is wholly located, and the other side may be a straight line where the first section 115 is wholly located, or a straight line where the first edge 111 is wholly located, or in the first direction y. The straight line where the third edge 113 is wholly located may be a straight line where a relatively straight part in the middle of the third edge 113 (e.g., one half in the middle of the third edge 113 or one third of the third edge 113 close to the upper part) is located. In a case where the third edge 113 is wholly an arc-shaped curve, the straight line where the third edge 113 is wholly located may be in a tangent direction at one third of the third edge 113 close to the upper part.

In an embodiment, the second angle β may be greater than the first angle α, for example because the angle α is set smaller in consideration of the relatively small angle between the tragus and the antitragus. In other words, the second angle β is greater than the first angle α may mean that an opening at a junction between the third side 113 and the first edge 111 is wider, and an opening at a junction between the second edge 112 and the first edge 111 is narrower, or a junction between the third side 113 and the second edge 112 is closer to an upper side of the first edge 111 in the first direction y. When the user wears the customized wireless earphone 10, the third side 113 is less limited by the ear structure than the second edge 112, so that various designs can be adopted, such as symmetry with the second edge 112 or any other design. In the embodiment of FIG. 5, the second angle β is designed to be greater than the first angle α, so that the area of the panel 110 can be appropriately increased to better accommodate various components, the shape of the panel 110 can be more similar to the shape of the corresponding part of the customized housing 500 of the customized wireless earphone 10 for easier mounting of the panel 110 and the customized housing 500, and meanwhile, the fit between the panel 110 and the user's ear can be improved, thereby improving the wearing comfort, the stability and the sound insulation and noise reduction effect of the customized wireless earphone 10. In another embodiment, in order for easier mounting of the panel 110 and the customized housing 500, the shapes of the first edge 111 and the second edge 112 may also be designed to be similar to the shapes of corresponding parts of the customized housing 500. In a case where each edge of the panel 110 has a shape similar to that of a corresponding part of the customized housing 500 (e.g., an opening above the inner cavity 501, i.e., a portion of the customized housing 500 connected to the panel 110), the panel 110 and the customized housing 500 may be easily mounted together for example by snapping, bonding, or the like.

Although the end points on the two sides of each of the first edge 111, the second edge 112, and the third side 113 are not explicitly marked in FIGS. 4 and 5, they may be set according to the actual situation, such as parts other than a rounded corner or an arc segment for connecting two edges, and the rounded corner or the arc segment for example may be corresponding to a certain degree (e.g., 30° to 70°).

In addition, in FIGS. 4 and 5, the edge of the panel 110 is marked with solid double lines because the panel 110 has a certain thickness and in this embodiment the edge of the panel is formed as a slope with a narrower upper part and a wider lower part, where the 'upper part' here refers to a side of the panel facing the exterior of the ear when the user wears the customized wireless earphone 10, i.e., the upper side shown in FIG. 1 or 2; and the 'lower part' here refers to the other side opposite to the 'upper part'. Of course, in other embodiments of the present disclosure, the edge of the panel 110 may also be a right-angle edge or a circular transition edge, which is not limited in the present disclosure.

In addition to the design of the shape of the panel 110, in the present disclosure, the size of the panel 110 is also designed based on the size data obtained by taking ear molds from a large number of users, so as to improve the wearing comfort, the stability and the sound insulation and noise reduction effect of the earphone, and to enable various components of the panel assembly to work normally while maintaining a high adaptation rate of the panel assembly.

Figure 6:
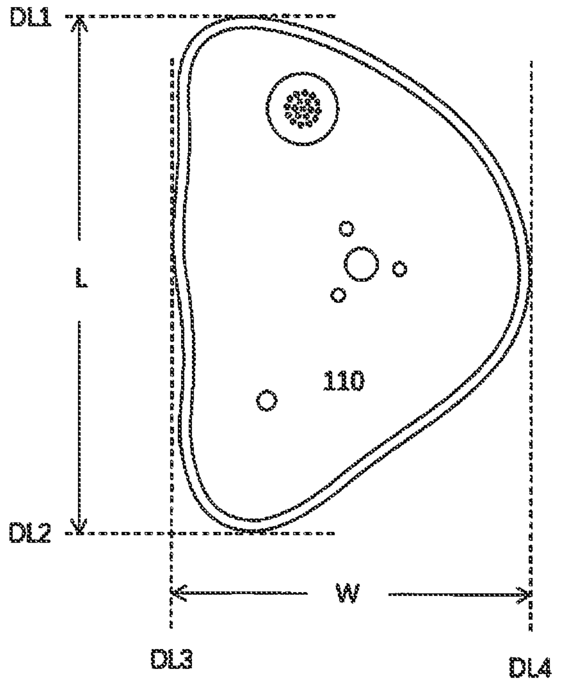
FIG. 6 shows a schematic diagram of a panel according to an embodiment of the present disclosure.

FIG. 6 shows a schematic diagram of a panel 110 according to an embodiment of the present disclosure. In an embodiment, the panel 110 has a length L of 22.4 to 28.2 mm, and a width W of 14.3 to 20.3 mm, where the length L of the panel 110 is a dimension of the panel 110 in the first direction y and the width W of the panel 110 is a dimension of the panel 110 in the second direction x. The second direction x is a direction perpendicular to the first direction y on the panel 110. The length and the width of the panel 110 for example may be obtained by measurements using two parallel lines in directions substantially perpendicular to the first direction y and the second direction x, respectively. For example, as shown in FIG. 6, when the panel 110 is placed in two parallel lines DL1 and DL2 in the direction substantially perpendicular to the first direction y (i.e., in the second direction x) and the panel 110 is connected to the two parallel lines, a distance between the two parallel lines DL1 and DL2 obtained at this time is the length L of the panel 110. Similarly, when the panel 110 is placed in two parallel lines DL3 and DL4 in the direction substantially perpendicular to the second direction x (i.e., in the first direction y), a distance between the two parallel lines DL3 and DL4 is the width W of the panel 110. Based on the size data obtained by taking ear molds from a large number of users, in a case where the panel 110 has a length L of 22.4 to 28.2 mm and a width W of 14.3 to 20.3 mm, the adaptation rate of the panel assembly 100 is above 70%. In this case, the panel assembly 100 may be adapted to most customized housings 500 and most users, the production cost of the earphone is reduced, and the production efficiency is improved. In a case where the panel 110 is in the above size range, the components of the panel assembly 100 can work normally through proper arrangement. If the size of the panel 110 is too small, the components of the panel assembly 100 may not be arranged (e.g., the panel 110 has no enough space to carry the components) or some components cannot work normally, and meanwhile, the wearing comfort, the stability, the sound insulation and noise reduction effect of the earphone are also degraded.

In the present disclosure, for a certain number of users, the adaptation rate of the panel assembly 100 refers to a ratio of the number of users of the manufactured customized wireless earphone 10 to which the panel assembly 100 may be adapted, to a counted total number of users. Specifically, 'adaptation' means that the panel assembly 100 is matched with the customized housing 500 and the user's ear. If the shape or the size of the panel 110 is not properly designed, the panel assembly 100 cannot be matched with the housing 500 customized for the user or the user's ear, and this situation is called inadaptation. For example, if the shape of the panel 110 is completely different from that of a connecting end (a side connected to the panel 110) of the customized housing 500 (e.g., the panel 110 is circular and the connecting end is a triangle with rounded corners), a complex special design is needed to assemble them together, in which case it may be considered that the panel assembly 100 is of inadaptation. If the size of the panel 110 is too large, the panel assembly 100 has a large difference in size from the customized housing 500 or the user's ear, and the matching is difficult (i.e., inadaptation). In addition, the panel 110 is located outside the ear in many cases and has a heavy weight when having a large size, which exerts a great compression on the user's ear, so that the wearing comfort is also degraded. If the size of the panel 110 is too small, in addition to an inadaptation between the panel 110 and the customized housing 500 due to a large size difference, there may also be an inadaptation because the panel 110 has no enough space to carry the components of the panel assembly 100 or the components may not work normally. For example, since the size of the panel 110 is too small, the size of the manipulation device 130 also needs to be reduced and the manipulation cannot be realized, or since the size of the panel 110 is too small to have enough area to operate the manipulation device 130 through the panel 110, the normal manipulation on the customized wireless earphone 10 cannot be realized. In this case, the manipulation device 130 cannot work normally. For another example, since the size of the panel 110 is too small, the antenna device 160 is too close to other metal components (e.g., the manipulation device 130, the battery 150, the magnet 170, etc.) to send and receive signals normally. Therefore, in the present disclosure, the size of the panel 110 should be properly designed and cannot be too large or too small.

In another embodiment, the panel 110 has a length of 23.9 to 26.1 mm and a width of 15.0 to 17.2 mm. In this case, the adaptation rate of the panel assembly 100 is above 85%. For example, when the panel 110 has a length of 24.8 mm and a width of 15.9 mm, the adaptation rate of the panel assembly 100 is about 99%. The panel 110 may be formed at one time by a mold, or may be formed by cutting a circular, square or other shaped plate, which is not limited in the present disclosure.

The calculation of the adaptation rate can adopt a simple mathematical method or any other statistical method. If the adaptation rate of a single type of panel assembly is low, in the production process of the customized wireless earphone, it is necessary to prepare panel assemblies of multiple specifications, including panels of various shapes and sizes and components thereof, which will increase the production cost and decrease the production efficiency. According to the present disclosure, by designing the shape and the size of the panel 110, the customized wireless earphone 10 can be well matched with the shape of the ear when being worn, thereby reducing the compression of the customized wireless earphone 10 on the ear, and improving the wearing comfort, the stability and the sound insulation and noise reduction effect of the earphone. Meanwhile, by designing the shape and the size of the panel 110, the components of the panel assembly 100 can work normally while maintaining a high adaptation rate of the panel assembly 100, so that the panel assembly 100 of the same specification can be mainly used in the production process, thereby reducing the production cost and improving the production efficiency of the earphone.

Referring back to FIG. 2, the customized wireless earphone 10 according to an embodiment of the present disclosure is further described. In an embodiment, the orthographic projections of the mainboard 120, the manipulation device 130, the charging device 140, the battery 150, the antenna device 160, the magnet 170, the sound pickup device 180, the speaker assembly 190, and the wireless communication module 195 on a plane where the panel 110 is located are located in the panel 110. As described above, the panel 110 may be a flat cover plate or any rugged or uneven cover plate. In a case where the panel 110 is the rugged or uneven cover plate, the plane where the panel 110 is located is an approximate plane that can be formed by the panel 110, and it is not required that most of the panel 110 is located in the plane, and for example, parts of the panel 110 above and below the plane may be the same or similar. The reason why the above components are disposed such that the orthographic projections thereof are located in the panel 110 is mainly to enable the panel 110 to cover the components, so that the panel 110 can easily form the panel assembly 100 and facilitate the mounting with the customized housing 500. If the orthographic projection of one or more components protrudes outside the panel 110, i.e., the panel 110 cannot cover the one or more components, there may be problems such as the bulge of the component makes the component cannot be mounted into the customized housing 500, or causes a collision with the component and affects the electrical connectivity of the component.

As shown in FIG. 2, in an embodiment, the manipulation device 130, the magnet 170, the mainboard 120 and the battery 150 may be sequentially arranged below the panel 110. By this arrangement, the components can be better accommodated in the inner cavity 501 of the customized housing 500. This is particularly important for the customized wireless earphone 10, because it is different from the non-customized earphone which can be provided with a large external rod portion or a bean portion. The customized wireless earphone 10 only has a small amount of protrusions (e.g., the panel 110 and a small part of the customized housing 500) in a direction perpendicular to the ear (i.e., a direction substantially perpendicular to the panel 110 when the customized wireless earphone 10 is worn), and substantially has no protrusion in a direction parallel to the ear (i.e., a direction parallel to the panel 110 when the customized wireless earphone 10 is worn). Thus, the inner cavity 501 of the customized housing 500 has a very small volume, and it is necessary to sufficiently design the positions and the sequences of the components so that the components can be accommodated in the inner cavity 501.

Although in the examples shown in FIGS. 1 and 2, the panel 110 is shown to be directly mounted to the customized housing 500, those skilled in the art will appreciate that the customized wireless earphone 10 may further include a panel adaption portion through which the panel 110 is mounted to the customized housing 500. As described above, in the process of manufacturing the customized wireless earphone 10, in order to reduce the production cost and improve the production efficiency, the panel 110 capable of improving the adaptation rate of the panel assembly 100 is adopted as much as possible, i.e., the panel 110 of a specific size is used for different users. However, since the sizes of the ears (e.g., the auricular concha cavities) of different users differ greatly, there is a problem that the panel 110 suitable for some users is too small in size for other users. In this case, the panel 110 can be better mounted to the customized housing 500 by disposing a panel adaption portion. The panel adaption portion may be a separate component or integral with the customized housing 500. For example, for a user with a large ear size, when being manufactured the customized housing 500 may be designed to have the panel adaption portion to narrow an opening of an uppermost part of the inner cavity 501 of the customized housing 500, so as to match the size of the panel 110 to facilitate the mounting of the panel 110 with the housing 500.

As shown in FIG. 2, in an embodiment, the manipulation device 130 is a touchpad that can be manipulated from above the panel 110, and may be substantially circular or elliptical in shape, or may adopt any other shape. The manipulation device 130 (touchpad) is substantially circular or elliptical in shape means that the overall outer contour of the manipulation device 130 is circular or elliptical in shape, and there may be some through-holes or depressions in the manipulation device 130, but this does not affect the shape of the overall outer contour of the manipulation device 130. Those skilled in the art can easily determine the general shape of the manipulation device 130. By operating with the touchpad instead of a mechanical knob or a mechanical switch, the user can control the customized wireless earphone 10 just by applying a small force, thereby reducing the pressure on the ear caused by the manipulation when the user wears the earphone. Meanwhile, since the touchpad has a long service life and a high stability, the failure rate of the manipulation device 130 is also reduced. The touchpad may be a conventional resistive or capacitive touchpad, and it is also possible to adopt any other touch technology, which is not limited in the present disclosure.

The operation on the manipulation device 130 may control the On/Off of the customized wireless earphone 10, the working mode, the start and the mode of noise reduction, the adjustment of the volume level, and Start, Pause, Previous, Next, Fast Forward, Fast Backward, etc. of the audio and video playing. The working mode of the customized wireless earphone 10 for example may be a Hi-Fi (High Fidelity) music mode, a call mode, a transparent mode, or the like. For example, in the Hi-Fi music mode, the audio output mode is adjusted to a mode suitable for music playing and the maximum noise reduction is enabled, so that the user can obtain good music experiences; in the call mode, the voice is enhanced and a proper noise reduction is enabled, so that the user can make a clear voice or video call; in the transparent mode, the external sound is transmitted to the ear without enabling the noise reduction, so that the user can normally perceive the external sound as if not wearing the earphone, thereby normally interacting with the outside or other persons. The noise reduction modes may include, for example, maximum noise reduction, proper noise reduction, non-noise reduction, and the like, and may also include various noise reduction modes defined according to the application scenarios, such as aircraft noise reduction, high-speed rail noise reduction, subway noise reduction, office noise reduction, and the like. The specific manipulation content is not limited to those described above and may include any other content, and the manipulation content may be preset or user-defined.

Although in FIG. 2, the manipulation device 130 is shown to be manipulated across the panel 110, those skilled in the art will appreciate that the manipulation device 130 may be arranged in the panel assembly 100 in any other manner and manipulated differently. For example, the panel 110 may be provided with a groove to expose the manipulation device 130, so that the user can directly operate the manipulation device 130.

In an embodiment, the charging device 140 is a charging pin or a metal coil capable of charging the customized wireless earphone 10 from above the panel 110. In FIG. 2, the charging device 140 is shown to include a plurality of charging pins, which are extended into the panel 110 for example through the manipulation device 130, and contacted with metal contacts of a charger or a charging stand from above the panel 110 through the opening of the panel 110 to charge the customized wireless earphone 10. Although FIG. 2 shows that the charging pins are extended into the panel 110 through the through-holes on the manipulation device 130, the charging pins may also pass through the manipulation device 130 in any other manner, for example, being extended into the panel 110 through depressed portions on an outer periphery of the manipulation device 130, extended into the panel 110 through the exterior of an outer contour of the manipulation device 130, and the like. By forming the through-holes or the depressed portions in the manipulation device 130 to allow the charging pins to pass through, the arrangements of the manipulation device 130 and the charging device 140 are more compact, and the spaces occupied by these components on the panel 110 and in the housing 500 are reduced, so that the sizes of the panel assembly 100 and the customized wireless earphone 10 can be reduced under the condition that the manipulation device 130 and the charging device 140 work normally, thereby improving the adaptation rate of the panel assembly 100 and the wearing comfort of the earphone.

The charging pin may protrude from the opening of the panel 110, i.e., an upper end of the charging pin may be higher than an upper surface of the panel 110. But the charging pin may also not protrude from the opening of the panel 110, i.e., the upper end of the charging pin may be slightly lower than the upper surface of the panel 110. In the latter case, the metal contacts of the charger or the charging stand matched with the charging pin need to be able to extend into the opening in the panel 110, which accommodates the charging pin, so as to contact the charging pins.

There may be two charging pins which are corresponding to a positive electrode and a negative electrode respectively, or there may be other numbers of charging pins, for example, one charging pin is provided as the positive electrode and three charging pins are provided as the negative electrode. As shown in FIG. 2, one positive charging pin may be located in the middle, for example, corresponding to a center of the touchpad 130, the battery 150 or the magnet 170; and three negative charging pins may equally surround the positive charging pin. A plurality of charging pins may be provided for a certain polarity, so that the connection reliability with the charger or the charging stand can be improved, i.e., even if some charging pins are in poor contact with corresponding contacts of the charger or the charging stand due to the problems such as stains, rust and insufficient height, the electrical connection can also be realized by other charging pins. In another embodiment, the polarities of the charging pins may be exchanged, for example, there are one negative charging pin and three positive charging pins. In other embodiments, other numbers of charging pins may also be adopted, such as one positive charging pin and two negative charging pins, or two positive charging pins and one negative charging pin. The thicknesses of the positive charging pin and the negative charging pin may be the same or different. For example, in a case where the charging pins include one positive charging pin and three negative charging pins, the positive charging pin may be set to be thicker than the negative charging pin, thereby improving the connection reliability with the charger or the charging stand during charging. The charging pin may have a fixed height or a certain elasticity, so that the charging pin can be better connected when being in contact with the contacts of the charger or the charging stand.

Figure 9:
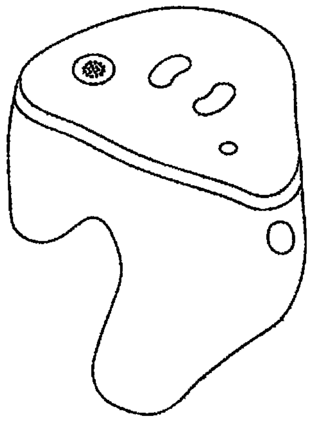
FIG. 9 shows a perspective view of a customized wireless earphone according to an embodiment of the present disclosure.

The charging pin may be in a needle shape viewed as a dot or a small circle from above the panel, or may be in various shapes viewed as a straight line segment, an arc segment, a folded line segment, a curve segment, and the like from above the panel. FIG. 9 shows a perspective view of a customized wireless earphone 10 according to an embodiment of the present disclosure. In this embodiment, the charging pin is an arc-shaped sheet, and the panel is provided with an arc-shaped opening allowing the charging pin to extend into, which is shown as an arc segment with a certain thickness in FIG. 7, and the connection reliability between the charging pin and the charger or the charging stand can be improved by setting a radian and a thickness.

Referring back to FIG. 2, in an embodiment, a support plate may be provided to fix the charging pin. In other embodiments, the charging pin may also be fixed in other manners. In a case where an identical electrode has more than one charging pin, these charging pins may be electrically connected through a conductive metal sheet or metal wire, and the metal sheet or the metal wire for example may also be fixed on the support plate.

In an embodiment, the charging device 140 may be a metal coil that charges the battery 150 of the customized wireless earphone 10 in a wireless charging mode such as electromagnetic induction. The metal coil for example may be formed of a material such as copper, and may be disposed below the panel 110. In a case where the charging device 140 is a metal coil, the charger or the charging stand matched therewith is a wireless charging device capable of charging the customized wireless earphone 10 in a wireless charging mode.

The battery 150 supplies power required for the working of the customized wireless earphone 10, and may adopt a rechargeable battery of a specific specification such as a rechargeable battery of type 1054 (i.e., a cross-sectional diameter of 10 mm and a height of 54 mm) or of any other specification. The battery 150 may be a lithium-ion battery or any other type of battery, which is not limited in the present disclosure.

The antenna device 160 is configured to send and receive wireless signals for the customized wireless earphone 10, so that the customized wireless earphone 10 can work wirelessly. For example, the antenna device 160 may be disposed below the panel 110 close to the first edge 111, so that the antenna device 160 is not shielded by other metal components and is as far away from other metal components as possible to better send and receive the wireless signals. The antenna device 160 may be in various forms such as a dipole antenna, a planar inverted-F antenna, or a ceramic antenna, which is not limited in the present disclosure.

The magnet 170 is configured to stably attract the customized wireless earphone 10 with the charger or the charging stand when the customized wireless earphone 10 is charged, thereby improving the charging connection stability. In one embodiment, the magnet 170 may be a circular magnet, in which case its center may coincide with a center of the touchpad 130 or the battery 150. Although only one circular magnet is shown in FIG. 2, those skilled in the art will appreciate that magnets of other numbers and shapes may also be adopted. For example, the customized wireless earphone 10 may not include the magnet 170, or may use two magnets with different polarities, and the magnet may be of various shapes such as a circle, an ellipse, and a square. In a case where the customized wireless earphone 10 uses two magnets with different polarities, corresponding settings may be made on the charger or the charging stand, so that the customized wireless earphone 10 and the charger or the charging stand can be better abutted against each other.

The mainboard 120 is configured to load and connect the main components of the customized wireless earphone 10, and these components include the manipulation device 130, the charging device 140, the battery 150, the antenna device 160, the sound pickup device 180, the speaker assembly 190, the wireless communication module 195, and the like. These components may be directly or indirectly (for example, by various fixing components or other components) fixed to the mainboard 120 by means of bolts, welding, gluing, and the like, and the components may be connected by a printed circuit, a lead, a flying wire, a spherical pin and the like on the mainboard 120. In the embodiment shown in FIG. 2, the mainboard 120 is a rigid mainboard, and may be disposed between the magnet 170 and the battery 150, or when there is no magnet 170, disposed between the manipulation device 130 and the battery 150 or between the support plate of the charging device 140 and the battery 150. In an embodiment, the customized wireless earphone 10 may be a flexible mainboard, which will be described in detail with reference to FIG. 10.

The mainboard 120 is configured to load and connect the main components of the customized wireless earphone 10, including the manipulation device 130, the charging device 140, the battery 150, the antenna device 160, the sound pickup device 180, the speaker assembly 190, the wireless communication module 195, and the like. These components may be directly or indirectly fixed to the mainboard 120 by means of bolts, welding, gluing, and the like (e.g., by various fixing components or by other components), and the connection between the respective components may be realized by a printed circuit, a lead, a flying wire, a spherical pin and the like on the mainboard 120. In the embodiment shown in FIG. 2, the mainboard 120 is a rigid mainboard, which may be disposed between the magnet 170 and the battery 150, or disposed between the manipulation device 130 and the battery 150 or between the support plate of the charging device 140 and the battery 150 without the magnet 170. In an embodiment, the customized wireless earphone 10 may adopt a flexible mainboard, which will be described in detail with reference to FIG. 10.

Referring back to FIG. 2, in an embodiment, the sound pickup device 180 may include two sound pickup devices 181 and 182. Depending on the functionality of the customized wireless earphone 10, the sound pickup devices 181 and 182 may be configured to pick up sound of the same type or different types, such as ambient sound and/or call sound, respectively. By using two or more sound pickup devices to pick up the sound, the sound picked up by different sound pickup devices can be processed, thereby achieving the effects of sound or sound field enhancement and noise reduction. In other embodiments, other numbers of sound pickup devices 180 may be adopted, such as one, three or more. The sound pickup device 180 may be of any type suitable for the earphone, such as a microphone like a micro-electromechanical microphone.

The speaker assembly 190 may include a sound output device configured to output sound for the customized wireless earphone 10, and the sound output device may be a moving iron speaker, a moving coil speaker, a coil iron speaker, or the like. In order to enable the sound output from the sound output device of the speaker assembly 190 to enter the acoustic meatus of the user wearing the customized wireless earphone 10, the customized housing 500 of the customized wireless earphone 10 is usually provided with an opening to allow the sound to pass through. In an embodiment, the speaker assembly 190 may further include a third sound pickup device configured to detect a frequency response characteristic of the sound output from the sound output device of the speaker assembly 190, thereby adjusting the output of the sound output device based on the frequency response characteristic.

The wireless communication module 195 may be disposed on the mainboard 120 or at other positions, and is configured to process the signal of the customized wireless earphone 10, so that the customized wireless earphone 10 can perform wireless communications. The wireless communication module 195 may be a Bluetooth module or any other type of wireless communication module, as long as it can implement the wireless operation of the customized wireless earphone 10. The wireless communication module 195 may be integrated into a central processing unit (CPU) of the customized wireless earphone 10, or may be a separate module.

As described above, the customized housing 500 may be manufactured based on an ear mold taken from the user's ear, and the manufacturing method may be 3D printing or any other manufacturing method. In an embodiment, the customized wireless earphone 10 may further include a ventilation duct provided in the customized housing 500 for ventilation when the user wears the customized wireless earphone 10. One end of the ventilation duct may be located at a protruding portion of the customized wireless earphone 10 extending into the external acoustic meatus, and the other end thereof may be located at a portion of the customized housing 500 close to the panel 110, so that the ventilation duct can balance the air pressures of the acoustic meatus and the external space when the user wears the customized wireless earphone 10, thereby reducing the discomfort caused by an increase of the pressure inside the ear.

In an embodiment, the customized housing 500 may include a first protruding portion 510 and a second protruding portion 520. When the user wears the customized wireless earphone 10, the first protruding portion 510 may be located in an external acoustic meatus of the user or an auricular concha cavity and the external acoustic meatus of the user, and the second protruding portion 520 may be located in a cymba conchae of the user. Referring to FIG. 7 and the description herein, it is possible to acquire a positional relationship between each part of the customized wireless earphone 10 and the user's ear when the user wears the customized wireless earphone 10. The first protruding portion 510 may include an opening, and the speaker assembly 190 is located in the first protruding portion close to the opening. That is, the sound output from the sound output device of the speaker assembly 190 enters the acoustic meatus of the user through the opening. In an embodiment, when the user wears the customized wireless earphone 10, a projection of the panel 110 in a direction of the user's ear is mostly located in the auricular concha cavity of the user, with a small part located in the cymba conchae of the user.

In an embodiment, the customized housing 500 may be integrally formed, i.e., formed at one time based on the ear mold of the user. In another embodiment, the customized housing 500 may also be composed of a plurality of parts. For example, the customized housing 500 may include an inner core portion that is the same for all or most users and may be assembled with the panel assembly 100, and a customized adaption portion formed based on the ear mold of the user. In a case where the customized housing 500 includes the inner core portion and the customized adaption portion, the production efficiency can be improved since components other than the customized adaption portion are the same for most users.

Figure 10:
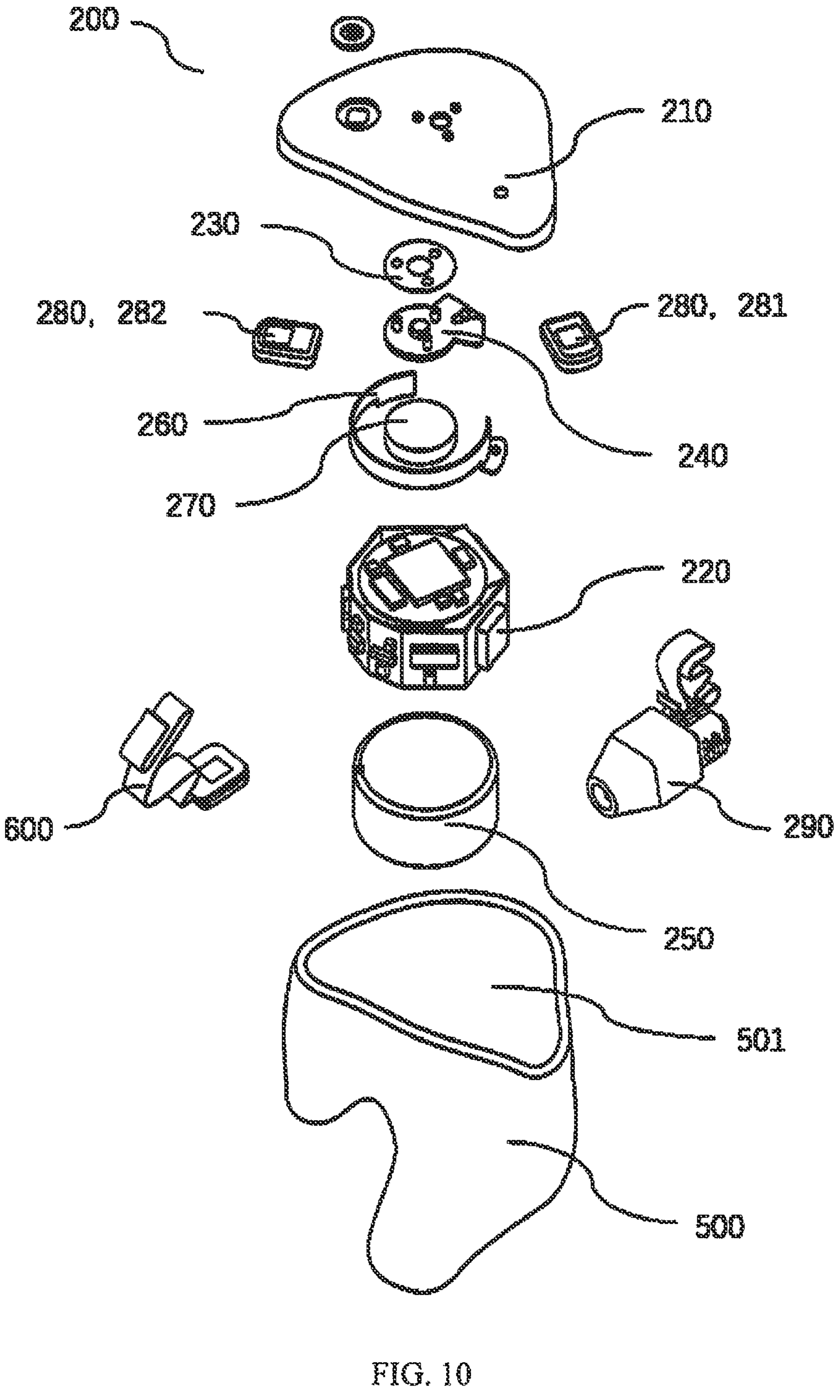
FIG. 10 shows an exploded view of a customized wireless earphone according to an embodiment of the present disclosure.

FIG. 10 is an exploded view of a customized wireless earphone 20 according to an embodiment of the present disclosure. As shown in FIG. 10, the customized wireless earphone 20 according to this embodiment includes a panel assembly 200 and a customized housing 500. The panel assembly 200 may include a panel 210, a mainboard 220, a manipulation device 230, a charging device 240, a battery 250, an antenna device 260, a magnet 270, a sound pickup device 280, a speaker assembly 290, a wireless communication module 295 (not shown), and the like. Except for the mainboard 220, the panel assembly 200, the panel 210, the manipulation device 230, the charging device 240, the battery 250, the antenna device 260, the magnet 270, the sound pickup device 280, the speaker assembly 290, and the wireless communication module 295 shown in FIG. 10 may be similar to the panel assembly 100, the panel 110, the manipulation device 130, the charging device 140, the battery 150, the antenna device 160, the magnet 170, the sound pickup device 180, the speaker assembly 190, and the wireless communication module 195 shown in FIG. 2, and the detailed descriptions thereof are omitted here for clarity.

As shown in FIG. 10, the mainboard 220 may be a folded circuit board or a flexible circuit board, which may at least partially surround the battery 250. By adopting the folded circuit board or the flexible circuit board, the arrangement flexibility of the components can be improved, and the spaces occupied by the components can be reduced.

Obviously, the above embodiments of the present disclosure are merely examples for clearly explaining the present disclosure, rather than limitations to the embodiments of the present disclosure. For those skilled in the art, other different forms of changes or modifications can be made based on the above descriptions. It is unnecessary and also impossible to exhaust all the embodiments here. Any modification, equivalent substitution or improvement made within the spirit and principle of the present disclosure should fall within the protection scope of the claims of the present disclosure.

In addition, the terms 'first' and 'second' are only used for descriptive purposes and cannot be construed as indicating or implying any relative importance.

LIST OF THE REFERENCE NUMERALS

10, 20: customized wireless earphone
100, 200: panel assembly
110, 210: panel
111: first edge
112: second edge
113: third edge
115: first section
116: second section
120, 220: mainboard

130, 230: manipulation device
140, 240: charging device
150, 250: battery
160, 260: antenna device
170, 270: magnet
180, 280: sound pickup device
181, 281: first sound pickup device
182, 282: second sound pickup device
190, 290: speaker assembly
195, 295: wireless communication module
500: customized housing
501: inner cavity
510: first protruding portion
520: second protruding portion
600: in-ear detection sensor
701: tragus
702: antitragus
703: auricular concha cavity
704: helix crus
705: antihelix
706: cymba conchae

The invention claimed is:

1. A customized wireless earphone, comprising a panel assembly and a customized housing, wherein:

the panel assembly comprises a panel, a mainboard, a manipulation device, a charging device, a battery, an antenna device, a sound pickup device, a speaker assembly and a wireless communication module; the mainboard, the manipulation device, the charging device, the battery, the antenna device, the sound pickup device, the speaker assembly and the wireless communication module are located in a space formed by the panel and the customized housing;

the panel comprises a first edge that comprises a first section, and a second edge that comprises a second section; when a user wears the customized wireless earphone, the first section is corresponding to a tragus of the user, the second section is corresponding to an antitragus of the user, and the first edge is extended in a first direction of the panel;

a first angle is formed by the second section and the first section, or the first edge, or the first direction;

the panel further comprises a third edge, and the second edge and the third edge are close to each other in a direction away from the first edge;

a second angle formed by the third edge and the first section, or the first edge, or the first direction is greater than the first angle; and the panel has a length of 22.4 to 28.2 mm and a width of 14.3 to 20.3 mm, wherein the length of the panel is a dimension of the panel in the first direction, and the width of the panel is a dimension of the panel in a second direction which is a direction on the panel perpendicular to the first direction.

2. The customized wireless earphone according to claim 1, wherein the first direction is a direction parallel to a meeting line of the user's ear and face when the user wears the customized wireless earphone, or a direction having an angle within 45° with the meeting line.

3. The customized wireless earphone according to claim 1, wherein the first angle is 45° to 65°.

4. The customized wireless earphone according to claim 1, wherein the panel has a length of 23.9 to 26.1 mm and a width of 15.0 to 17.2 mm.

5. The customized wireless earphone according to claim 1, wherein the panel is substantially a triangle with rounded corners or a D-shape.

6. The customized wireless earphone according to claim 1, wherein orthographic projections of the mainboard, the manipulation device, the charging device, the battery, the antenna device, the sound pickup device, the speaker assembly and the wireless communication module on a plane where the panel is located are located within the panel.

7. The customized wireless earphone according to claim 1, further comprising a magnet, wherein the manipulation device, the magnet, the mainboard and the battery are sequentially disposed below the panel.

8. The customized wireless earphone according to claim 1, further comprising a panel adaption portion through which the panel is mounted to the customized housing.

9. The customized wireless earphone according to claim 1, wherein the manipulation device is a touchpad that can be manipulated from above the panel, and the charging device is a charging pin or a metal coil that can charge the customized wireless earphone through the panel.

10. The customized wireless earphone according to claim 1, further comprising a ventilation duct disposed in the customized housing for ventilation when a user wears the customized wireless earphone.

11. The customized wireless earphone according to claim 1, wherein the customized housing comprises a first protruding portion and a second protruding portion, and when the user wears the customized wireless earphone, the first protruding portion is located in an external acoustic meatus of the user or an auricular concha cavity and the external acoustic meatus of the user, and the second protruding portion is located in a cymba conchae of the user, wherein the first protruding portion comprises an opening, and the speaker assembly is located in the first protruding portion close to the opening.

12. The customized wireless earphone according to claim 1, further comprising an in-ear detection sensor configured to detect whether the customized wireless earphone is in a wearing state.

13. The customized wireless earphone according to claim 1, wherein the mainboard is a folded circuit board or a flexible circuit board, and at least partially surrounds the battery.

14. The customized wireless earphone according to claim 1, wherein the first edge comprises a bulge in a middle of the first edge and depressions on both sides of the bulge, the first edge curves with a smaller curvature at an outside of each said depression, and the first section of the first edge comprises one of said depressions adapted to receive the tragus of the user.

* * * * *